United States Patent
Pelissier et al.

(10) Patent No.: US 10,817,030 B2
(45) Date of Patent: Oct. 27, 2020

(54) PORTABLE INFORMATION HANDLING SYSTEM FLEXIBLE DISPLAY WITH ALTERNATING SLIDE SUPPORT FRAME

(71) Applicant: Dell Products L.P., Round Rock, TX (US)

(72) Inventors: Gerald Rene Pelissier, Mendham, NJ (US); Kevin M. Turchin, Cedar Park, TX (US); John Trevor Morrison, Round Rock, TX (US); Yung-Fa Cheng, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/246,690

(22) Filed: Jan. 14, 2019

(65) Prior Publication Data
US 2020/0225711 A1    Jul. 16, 2020

(51) Int. Cl.
G06F 1/16    (2006.01)

(52) U.S. Cl.
CPC .......... *G06F 1/1681* (2013.01); *G06F 1/1624* (2013.01); *G06F 1/1652* (2013.01)

(58) Field of Classification Search
CPC .... G06F 1/1681; G06F 1/1652; G06F 1/1615; G06F 1/1624
See application file for complete search history.

(56) References Cited

U.S. PATENT DOCUMENTS

| | | | |
|---|---|---|---|
| 7,558,057 B1 | 7/2009 | Naksen et al. | |
| 8,804,349 B2 | 8/2014 | Lee et al. | |
| 9,164,547 B1 | 10/2015 | Kwon et al. | |
| 9,204,565 B1 * | 12/2015 | Lee | E05D 7/00 |
| 9,348,450 B1 * | 5/2016 | Kim | G06F 1/1681 |
| 9,506,279 B2 | 11/2016 | Kauhaniemi | |
| 9,557,771 B2 * | 1/2017 | Park | G06F 1/1652 |
| 9,603,271 B2 | 3/2017 | Lee | |
| 9,606,583 B2 | 3/2017 | Ahn et al. | |
| 9,684,343 B2 * | 6/2017 | Tazbaz | G06F 1/1618 |
| 9,710,033 B2 | 7/2017 | Yamazaki et al. | |
| 9,760,126 B2 * | 9/2017 | Shin | G06F 1/1652 |
| 9,798,359 B2 | 10/2017 | Seo | |
| 9,848,502 B1 | 12/2017 | Chu | |
| 9,870,031 B2 | 1/2018 | Hsu et al. | |
| 9,874,048 B1 * | 1/2018 | Hsu | E05D 11/1028 |
| 9,874,906 B1 * | 1/2018 | Hsu | G06F 1/1681 |
| 9,915,981 B2 | 3/2018 | Hsu | |
| 9,992,888 B2 * | 6/2018 | Moon | G06F 1/1618 |
| 10,082,839 B1 * | 9/2018 | Turchin | G06F 1/1652 |
| 10,104,790 B2 * | 10/2018 | Lee | E05D 11/0054 |
| 10,111,346 B2 * | 10/2018 | Seo | G06F 3/044 |
| 10,143,098 B1 * | 11/2018 | Lee | E05D 11/06 |

(Continued)

*Primary Examiner* — Abhishek M Rathod
*Assistant Examiner* — Keith DePew
(74) *Attorney, Agent, or Firm* — Zagorin Cave LLP; Robert W. Holland

(57) ABSTRACT

A portable information handling system integrates a sliding support with interlaced fingers below a flexible display to adjust support the display based upon rotational orientation of housing portions of the information handling system. In a closed position, the sliding support compresses by fully engaging the fingers so that room is provided over a hinge assembly that rotationally couples the housing to provide folding of the flexible display without wrinkling or compression.

12 Claims, 8 Drawing Sheets

(56) References Cited

U.S. PATENT DOCUMENTS

| | | | |
|---|---|---|---|
| 10,185,364 B2 | 1/2019 | Seo | |
| 10,209,743 B1 | 2/2019 | Hsu | |
| 10,231,347 B2* | 3/2019 | Seo | H04M 1/0268 |
| 10,244,641 B2* | 3/2019 | Seo | G06F 1/1641 |
| 10,274,996 B2* | 4/2019 | Lin | G06F 1/1641 |
| 10,306,783 B2* | 5/2019 | Seo | H04M 1/0216 |
| 10,327,346 B2* | 6/2019 | Zhang | H05K 5/0017 |
| 10,365,691 B2* | 7/2019 | Bae | G06F 1/1652 |
| 10,383,239 B2* | 8/2019 | Lee | H05K 5/0217 |
| 10,423,196 B2 | 9/2019 | Seo | |
| 10,433,438 B2 | 10/2019 | Moon | |
| 10,448,521 B2* | 10/2019 | Seo | H05K 1/0203 |
| 2010/0232100 A1 | 9/2010 | Fukuma | |
| 2012/0264489 A1 | 10/2012 | Choi | |
| 2012/0307423 A1 | 12/2012 | Bohn | |
| 2012/0307472 A1 | 12/2012 | Bohn | |
| 2013/0021762 A1* | 1/2013 | van Dijk | G06F 1/1652 361/749 |
| 2013/0037228 A1 | 2/2013 | Verschoor | |
| 2013/0070431 A1 | 3/2013 | Fukuma | |
| 2013/0286553 A1 | 10/2013 | Vanska | |
| 2014/0042293 A1 | 2/2014 | Mok | |
| 2014/0111954 A1* | 4/2014 | Lee | G06F 1/1641 361/749 |
| 2014/0123436 A1* | 5/2014 | Griffin | H04M 1/0216 16/221 |
| 2014/0126133 A1* | 5/2014 | Griffin | G06F 1/1616 361/679.27 |
| 2014/0196253 A1 | 7/2014 | Song | |
| 2014/0226275 A1 | 8/2014 | Ko | |
| 2014/0328041 A1 | 11/2014 | Rothkopf | |
| 2015/0062525 A1 | 3/2015 | Hirakata | |
| 2015/0233162 A1* | 8/2015 | Lee | H04M 1/02 16/223 |
| 2015/0277506 A1 | 10/2015 | Cheah et al. | |
| 2015/0366089 A1* | 12/2015 | Park | G06F 1/1652 361/679.01 |
| 2016/0066454 A1 | 3/2016 | Hill | |
| 2016/0132076 A1 | 5/2016 | Bitz et al. | |
| 2016/0195901 A1 | 7/2016 | Kauhaniemi | |
| 2016/0227645 A1* | 8/2016 | Hampton | G06F 1/1601 |
| 2016/0370828 A1 | 12/2016 | Hsu | |
| 2017/0139442 A1* | 5/2017 | Yoshizumi | G06F 1/1681 |
| 2017/0290179 A1* | 10/2017 | Zhang | H05K 5/0017 |
| 2017/0307929 A1* | 10/2017 | Nakazawa | G02F 1/133305 |
| 2018/0014417 A1* | 1/2018 | Seo | H05K 5/0017 |
| 2018/0059734 A1* | 3/2018 | Knoppert | G06F 1/1681 |
| 2018/0077808 A1* | 3/2018 | Seo | G06F 3/044 |
| 2018/0095502 A1* | 4/2018 | Yamazaki | H01L 27/3232 |
| 2018/0103550 A1* | 4/2018 | Seo | H04N 5/64 |
| 2018/0181164 A1* | 6/2018 | Chen | G06F 1/1624 |
| 2018/0188778 A1* | 7/2018 | Shin | G06F 1/1652 |
| 2018/0232011 A1* | 8/2018 | Jiang | G06F 1/1652 |
| 2018/0242466 A1* | 8/2018 | Lee | G09F 9/301 |
| 2018/0292860 A1* | 10/2018 | Siddiqui | G06F 1/1618 |
| 2018/0324964 A1* | 11/2018 | Yoo | E05D 3/18 |
| 2018/0347245 A1* | 12/2018 | Chu | F16M 13/00 |
| 2019/0073002 A1* | 3/2019 | Wu | G06F 1/1626 |
| 2019/0302848 A1* | 10/2019 | Han | G06F 1/1616 |

* cited by examiner

PORTABLE INFORMATION HANDLING SYSTEM FLEXIBLE DISPLAY WITH ALTERNATING SLIDE SUPPORT FRAME

BACKGROUND OF THE INVENTION

Field of the Invention

The present invention relates in general to the field of portable information handling system displays, and more particularly to a portable information handling system flexible display with an alternating slide support frame.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in portable housing to support mobile operations free from external cables. For example, portable information handling systems typically integrate processing components, a battery and a touchscreen display that presents information as visual images and accepts touches as inputs. Tablet portable information handling systems generally dispose processing components and the battery in a planar housing covered by the touchscreen display. Convertible information handling systems typically have separate planar housing portions rotationally coupled by a hinge to rotate between a closed position and various open positions that accept inputs, such as a clamshell and tablet position. Conventional convertible information handling systems integrate the touchscreen display in one planar housing portion and a keyboard in the other planar housing portion so that an end user can type inputs into the information handling system. Some convertible information handling systems rotate housing portions 360 degrees relative to each other to a tablet position that exposes the touchscreen display on one side and hides the keyboard underneath on the other side.

One type of touchscreen display used in portable information handling systems is an organic light emitting diode (OLED) display, which illuminates colors at pixels by electrical stimulation of an organic material. OLED displays provide a thinner solution than conventional liquid crystal displays (LCDs), which rely upon a backlight to illuminate an image. OLED displays are typically built by disposing a flexible OLED film over a substrate. In a conventional tablet or convertible system, OLED display films are typically disposed over a glass or other stiff substrate to provide a firm surface against which an end user may make touch inputs. Some convertible information handling systems include an OLED display over both rotationally coupled housing portions, in effect replacing the keyboard with a touchscreen display. In such systems, when the housing portions rotate to a clamshell configuration, a keyboard presented at the display accepts typed inputs. When the system rotates 180 degrees to a flat configuration, both display surfaces are available for presenting visual images as tablet. An advantage of this configuration is that a larger tablet display area is available for viewing information, while a closed configuration improves portability. A disadvantage of this configuration is that a seam exists between the two display areas where the hinge rotationally couples the housing portions to each other.

Since OLED films are flexible, mounting an OLED film on a flexible substrate, such as a plastic substrate, allows folding of a display with a hinge about an intersection of housing portions. With a POLED flexible display, the display is disposed over both rotationally coupled housing portions to fold with hinge rotation between closed and open positions. The closed position protects the display and offers reduced size for improved portability. The open position offers a contiguous display area across both housing portions for improved visual image presentation. A difficulty with incorporation of a flexible OLED display in a flexible housing is that the rotation about the hinge has a different degree of motion for the display on the inner circumference of the motion and the housing that supports the display, which resides in a different plane of travel. The "gap" in relative motion has to be accommodated or the flexible display will have waviness introduced with associated poor electrical and optical damage, including likely physical damage.

SUMMARY OF THE INVENTION

Therefore, a need has arisen for a system and method which supports a flexible display over rotationally coupled housing portions.

In accordance with the present invention, a system and method are provided which substantially reduce the disadvantages and problems associated with previous methods and systems for folding a display supported across rotationally coupled housing portions. A sliding support having opposing portions with interlaced fingers slides in alternating directions to support a flexible display in a flat position and provide room for folding the flexible display in a closed position.

More specifically, a portable information handling system processes information with processing components disposed in rotationally coupled housing portions and presents the information as visual images at flexible display disposed as a contiguous structure over the housing portions. A sliding support disposed within each housing portion adjusts to provide support underneath the flexible display in a flat position and slides away from an opening defined in the housing portions that provides room to the flexible display to fold without compression or wrinkling. The sliding support has opposing planar portions with interlaced fingers that move in alternating directions to interlock and separate the fingers under the flexible display. When extended apart from each other, one planar portion extends outward from the housing and the other planar portion extends inward over top of a hinge assembly that rotationally couples the housing portions to each other. Extension of the inner and outer portions away from each other supports the flexible display across the housing portions in the flat position. When compressed to interlock the fingers, the inner portion slides away from the hinge to leave an opening in which the flexible display fits during transition to a closed position.

The present invention provides a number of important technical advantages. One example of an important technical advantage is that a portable information handling system having a flexible display disposed over rotationally coupled housing portions adjusts a support surface based upon the rotational orientation of the housing portions. Interlaced fingers cooperate under the flexible display to support against finger or stylus touches to the flexible display. Upon first rotation to a closed position, the interlace fingers fully engage to compress the size of the sliding support, thus making room for folding of the flexible display over the hinge.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system includes a sliding support to manage folding of a flexible display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
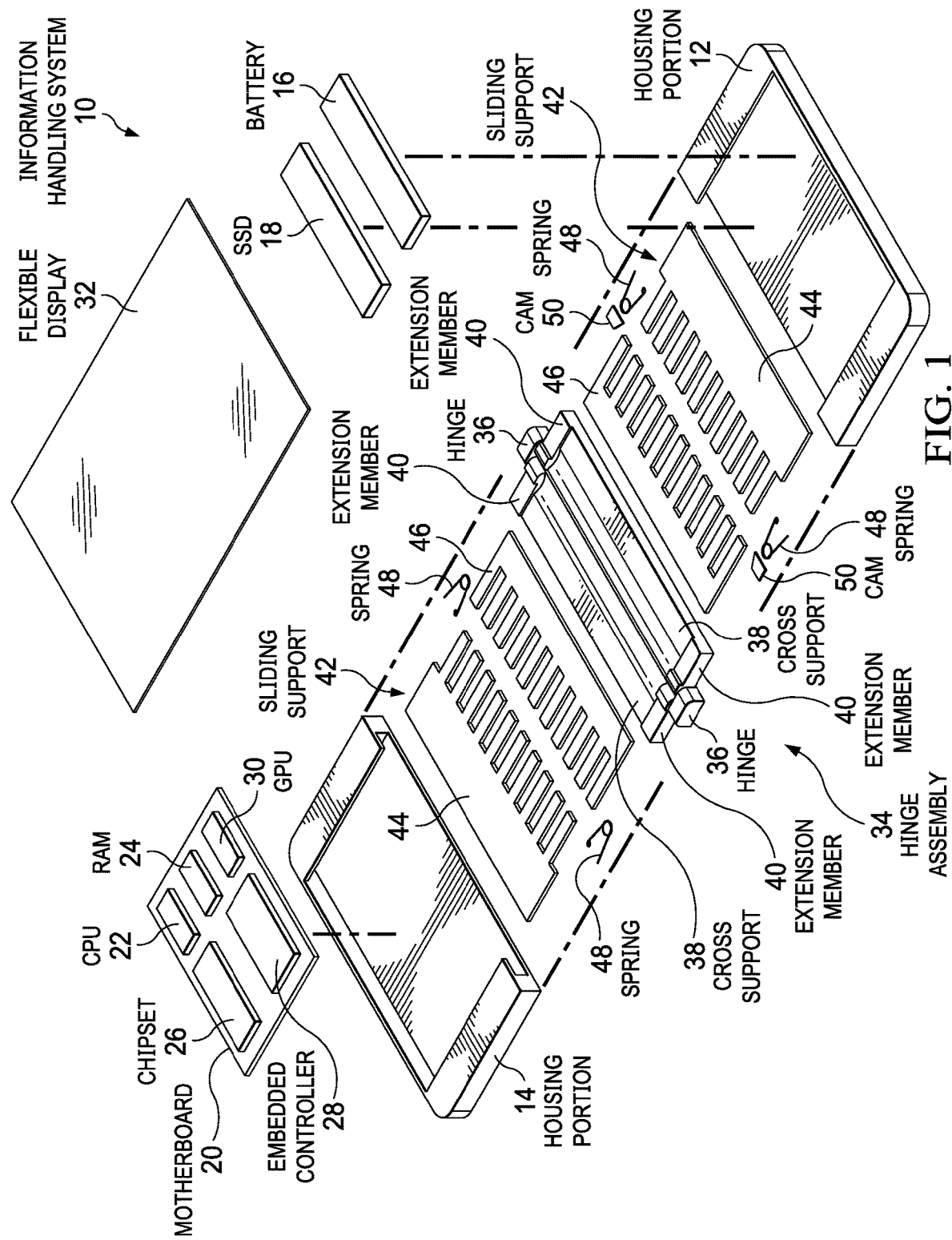
FIG. 1 depicts an exploded view of a portable information handling system having a flexible display with folding managed by a sliding support.

Referring now to FIG. 1, an exploded view depicts a portable information handling system 10 having a flexible display 32 with folding managed by a sliding support 42. In the example embodiment, portable information handling system 10 has processing components integrated into a first housing portion 12 and second housing portion 14. For instance, first housing portion 12 holds a battery 16 that powers the processing components and solid state drive (SSD) 18 that provides persistent storage of information, an operating system and applications. Second housing portion 14 holds a motherboard 20 that interfaces processing components that cooperate to process information. For instance, a central processing unit (CPU) 22 executes instructions to process information in cooperation with random access memory (RAM) 24 that stores the instructions and information. A chipset 26 includes a variety of components and embedded code that aid operation of CPU 22, such as for memory accesses and clock speed. An embedded controller 28 manages power for the processing components as well as interfaces with input/output (I/O) devices, such as touches made at a touchscreen integrated in flexible display 32. A graphics processor unit (GPU) 30 interfaces with CPU 22 to process information for presentation as visual images, such as pixel values that define a visual image at flexible display 32. In various embodiments, various configurations and placements of processing components may be used in housing portions 12 and 14 to achieve a desired performance level.

Flexible display 32 interfaces with GPU 30 to present visual images as defined by GPU 30. Flexible display 32 has a flexible display film that folds across at least a central portion. For example, flexible display 32 is a plastic-substrate organic light emitting diode display (POLED), although other flexible display configurations may be used. For instance, flexible display 32 may have a solid substrate in portions that do not fold, such as glass substrate, with a foldable plastic substrate at a portion in the center where folding is intended as set forth below. Flexible display 32 is disposed over both housing portions 12 and 14, which rotationally couple to each other by a hinge assembly 34. Housing portions 12 and 14 rotate relative to each other between a closed position and flat position to provide mobility yet have a wide viewing area when in use, as is shown in greater detail in the figures below.

Hinge assembly 34 is a dual axle assembly having first and second dual axle hinges 36 at opposing sides of a cross support 38. An extension member 40 couples to each housing portion 12 and 14 and also extends and retracts based upon the rotational orientation of each hinge 36. As hinge assembly 34 rotates to a closed position, extension member 40 extends outward from hinge assembly 34 to engage with sliding support 42, aiding configuration of sliding support 42 to support flexible display 32 in a folded configuration. Cross supports 38 are aligned to define a space between each other in the closed position that provides room for flexible display 32 in the folded configuration. The relative spacing of an example embodiment of hinge assembly 34 is presented in the figures as described below.

In the example embodiment, a sliding support 42 is disposed in each housing portion 12 and 14 to provide support under flexible display 32 in the flat position while providing room for folding flexible display 32 in the closed position. Each sliding support 42 has first and second planar portions 44 and 46 with interlaced fingers 52 aligned so that planar portions 44 and 46 slidingly engage with each other. Planar portions 44 and 46 rest under flexible display 32 to provide support in the flat and closed positions. In the flat position, interlaced fingers slide apart to extend inner planar portion 46 over hinge assembly 34 and to extend outer planar portion 44 outwards and away from hinge assembly 34. The openings formed in the flat position by space between interlaced fingers 52 are defined to have sufficient support of flexible display 32 so that end user touches and stylus touches will not fold the display inwards. In the closed position, interlaced fingers press towards each other with inner portion 46 moving away from hinge assembly 34 to create an opening in which flexible display 32 folds. The amount of movement is gauged to adapt to the circumference defined by motion of hinge assembly 34. That is, flexible display 32 is located on the inner circumference of the assembled information handling system 10 so that it moves in relative terms outward towards the edge of housing portions 12 and 14 when rotated from the closed to the flat position.

In the example embodiment, a spring 48 and rotating cam 50 cooperate to regulate movement of sliding portions 44 and 46 in response to rotation of the housing portions. During rotation to a closed position, extension member 40 engages sliding support 42 to press portions 44 and 46 together, thereby loading spring 48 and rotating cam 50. Upon rotation from the closed to the flat position, cam 50 rotates to hold spring 48 from pressing portions 44 and 46 apart until a predetermined amount of rotation has occurred, such as past 90 degrees of rotation. As rotation continues of housing portions 12 and 14 to the flat position, cam 50 releases spring 48 to press portions 44 and 46 apart from each other so that inner planar portion 46 slides across the opening defined over hinge assembly 34. The rotational orientation at which spring 48 releases is based upon the fold formed by flexible display 32 so that lateral forces are not pressed against flexible display 32, which could result in physical damage.

Figure 2:
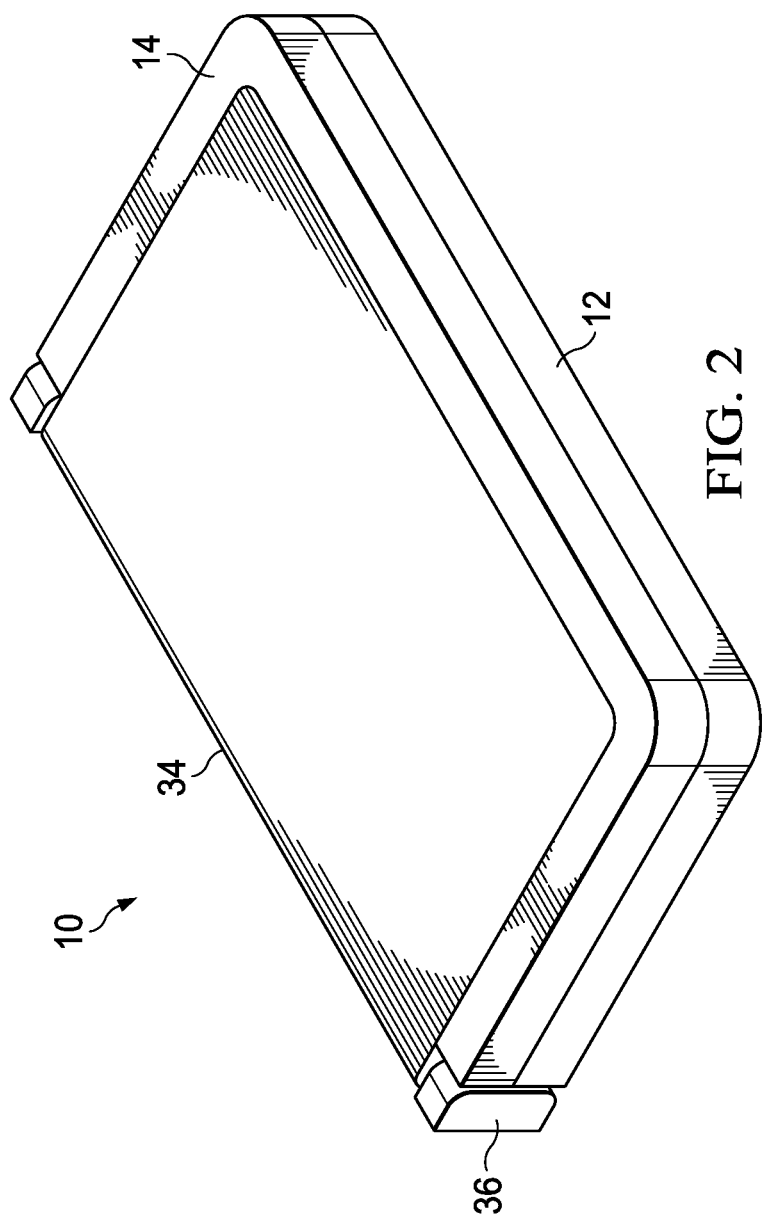
FIG. 2 depicts an upper side perspective view of the information handling system in a closed position.

Referring now to FIG. 2, an upper side perspective view depicts information handling system 10 in a closed position. Housing portions 12 and 14 rotate about hinge assembly 34 so that flexible display 32 is protected in an interior position. Hinge 36 has dual axles that maintain a spacing between housing portions 12 and 14 to provide room in which flexible display 32 folds. Sliding support 42 disposed under flexible display 32 slides to create room adjacent hinge assembly 34 for folding of flexible display 32.

Figure 3B:
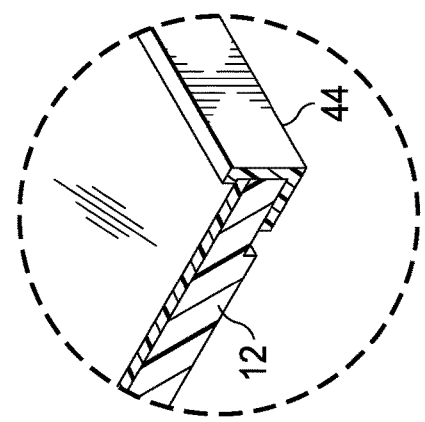
FIGS. 3A-3B depict an upper side perspective view of the information handling system in a clamshell position.
Figure 3A:
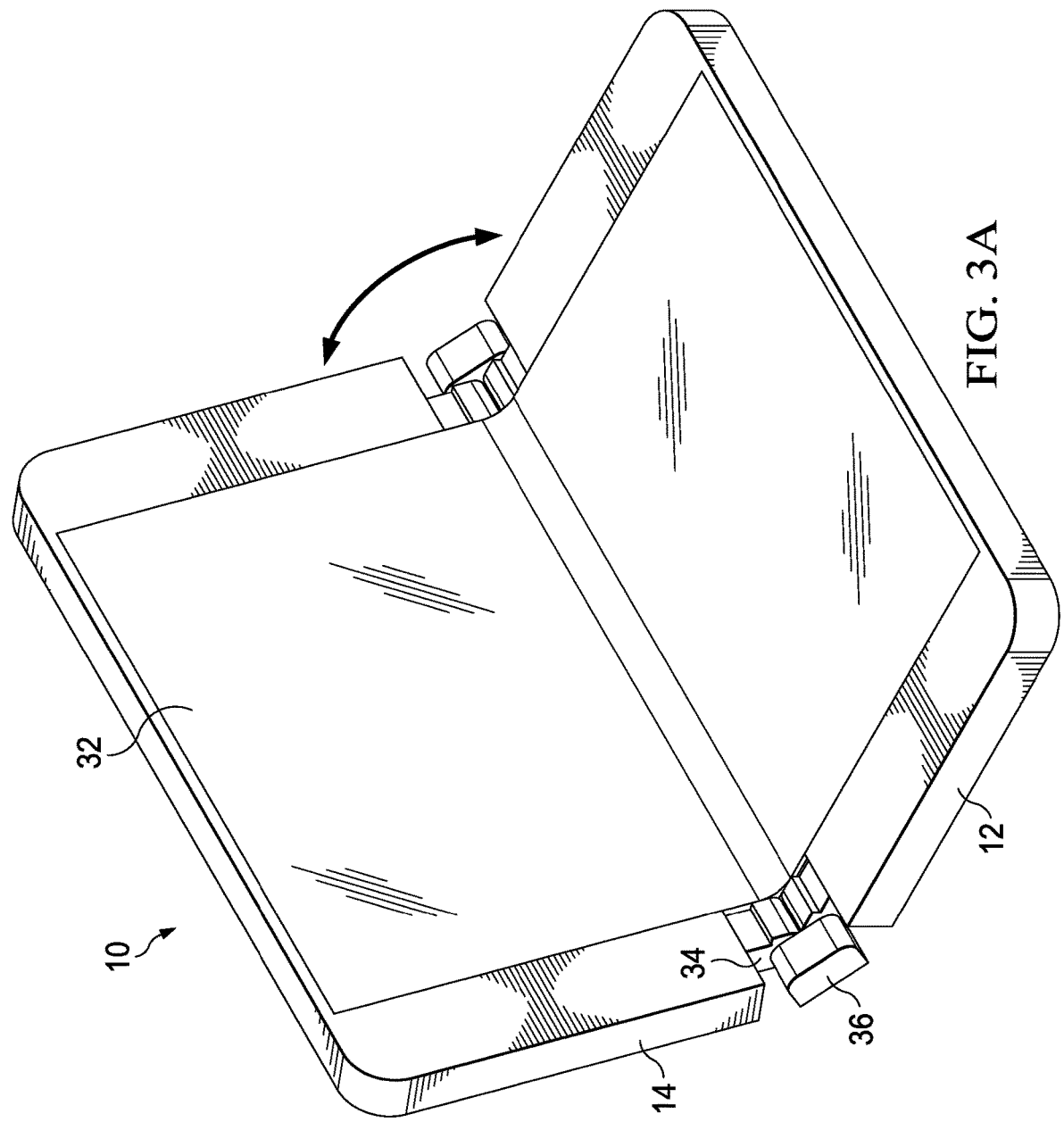

Referring now to FIG. 3, an upper side perspective view depicts information handling system 10 in a clamshell position. Housing portion 14 has rotated approximately 90 degrees relative to housing portion 12 about hinge assembly 34. In the example embodiment, hinge 36 is a synchronized hinge having an internal geared relationship that synchronizes rotation about each axle. Flexible display 32 has a raised viewing portion disposed over housing portion 14 and a base portion disposed over housing portion 12 that, for instance, can present a virtual keyboard for accepting typed inputs. As housing portions 12 and 14 rotate towards the flat position, the relative length of flexible display 32 increases so that extension of outer planar portion 44 of sliding support 42 provides support under flexible display 32. The cutaway expanded view of information handling system 10 depicts an example embodiment in which outer planar portion 44 forms a lip around housing portion 12 to extend outward in a seamless manner.

Figure 4:
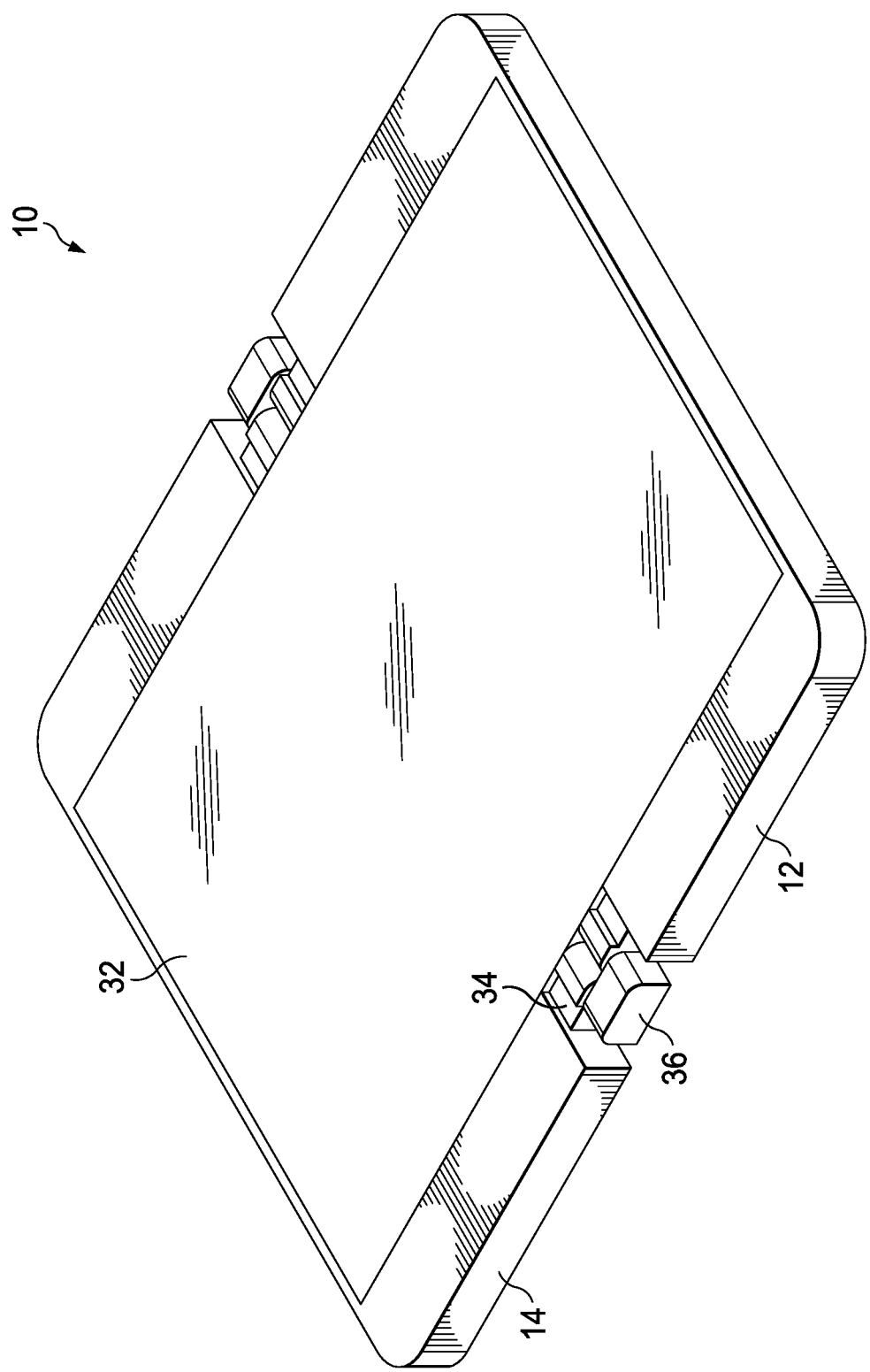
FIG. 4 depicts a side perspective view of the information handling system housing portions rotated to a flat position.

Referring now to FIG. 4, a side perspective view depicts information handling system 10 housing portions 12 and 14 rotated to a flat position. Flexible display 32 extends across housing portions 12 and 14 and over hinge assembly 34 as a contiguous tablet that accepts end user touch inputs. Sliding support 42 slides under flexible display 32 and over hinge assembly 34 to provide support against end user and stylus touches.

Figure 5:
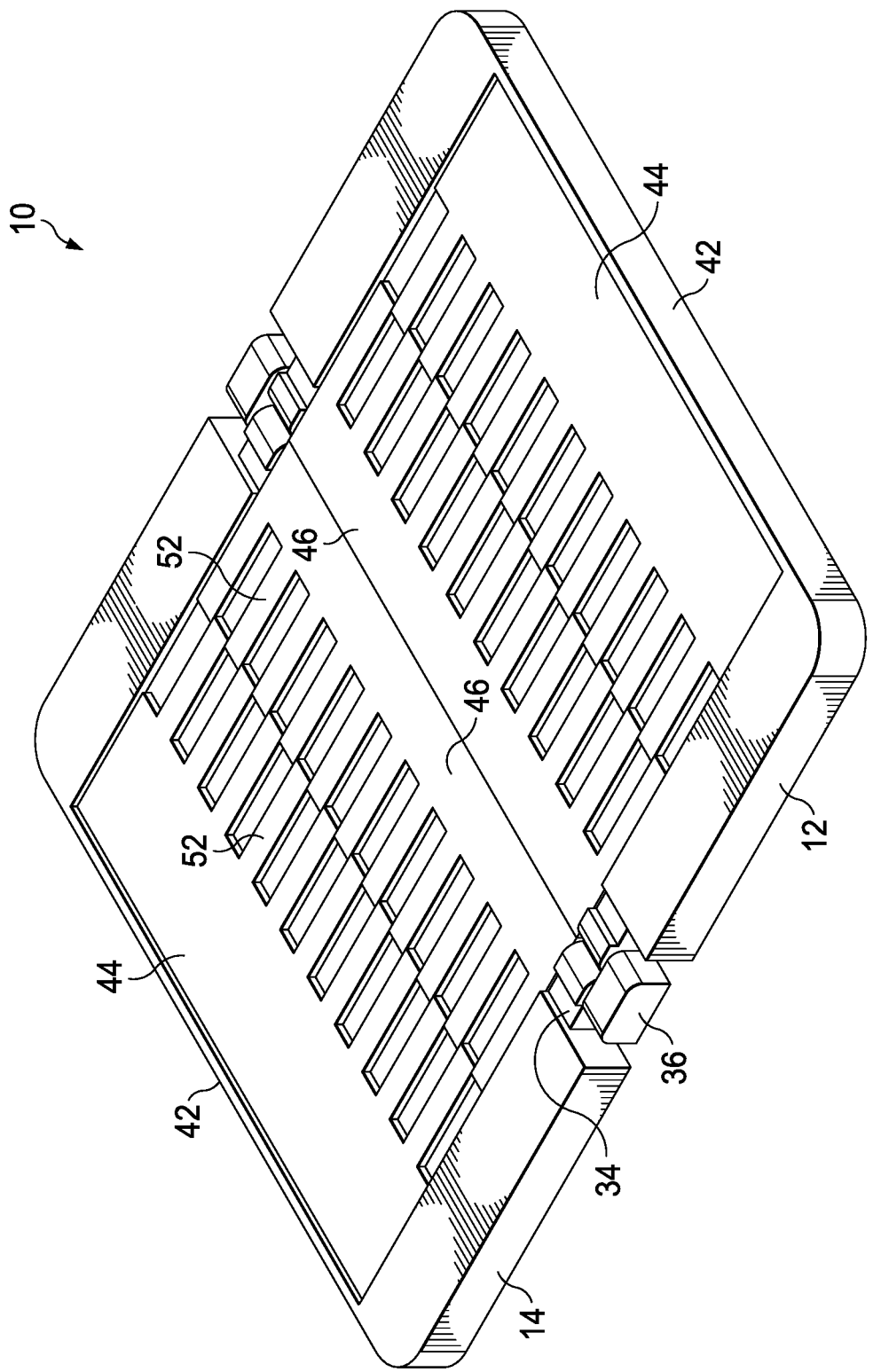
FIG. 5 depicts a side perspective view of the housing portions with the sliding support extended to provide support under the flexible display.

Referring now to FIG. 5, a side perspective view depicts housing portions 12 and 14 with sliding support 42 extended to provide support under flexible display 32. With flexible display 32 removed, the relationship of planar portions 44 and 46 illustrates interlaced fingers separated to provide dispersed support of flexible display 32 and allows inner planar portion 46 to slide over the top of hinge assembly 34. In the example embodiment, outer planar portion 44 has 10 fingers 52 and inner planar portion 46 has 11 fingers 52 so that the spacing between fingers 52 is small enough to prevent excessive flexibility of the plastic substrate under flexible display 32. In the example embodiment, a sliding support 42 is placed over each housing portion 12 and 14, however, in an alternative embodiment, a sliding support may be used on only one housing portion with flexible display 32 fixed in position over the other housing portion.

Figure 6:
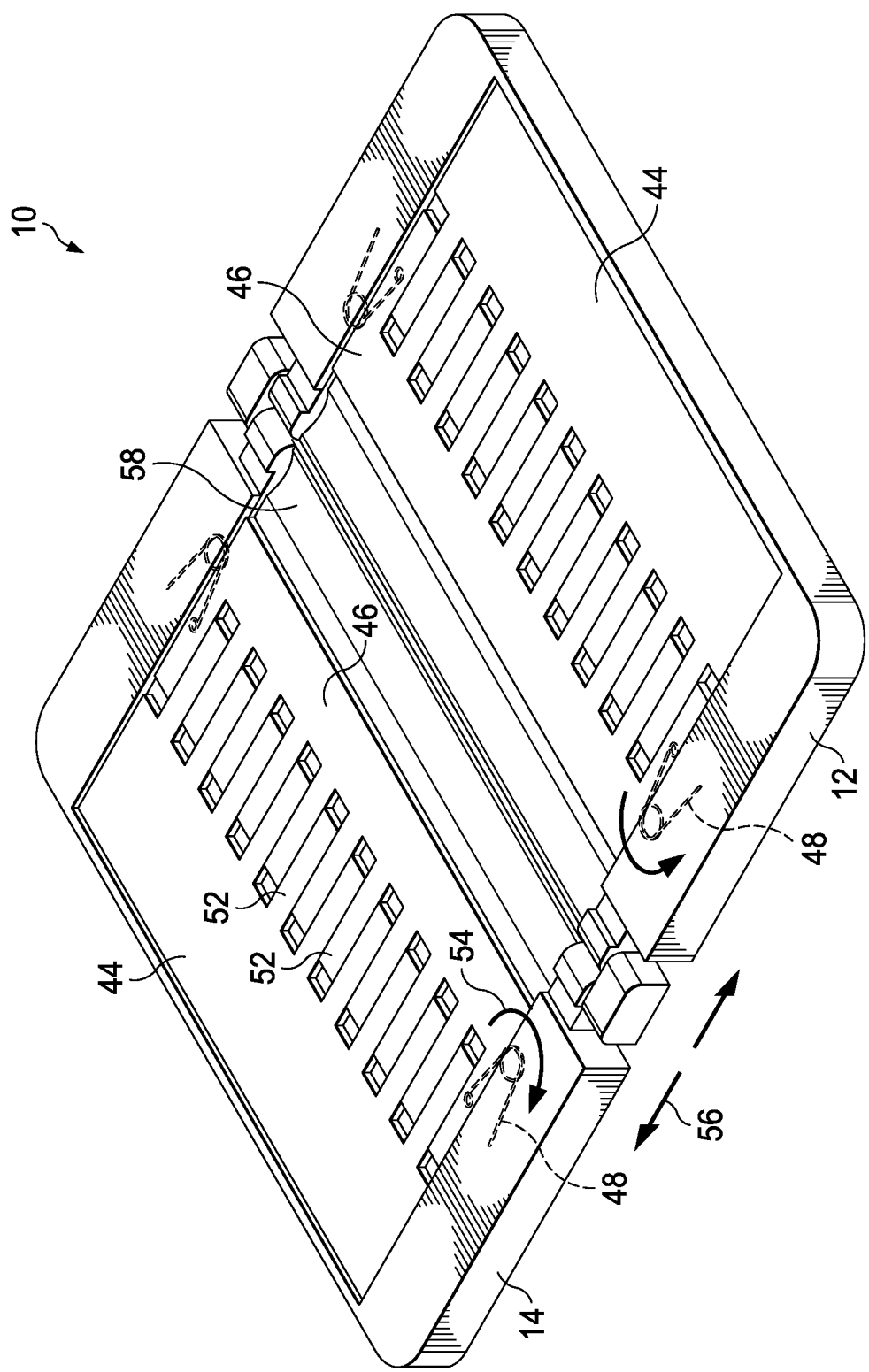
FIG. 6 depicts a side perspective view of the flexible supports retracted to illustrate an open space defined over the hinge assembly.

Referring now to FIG. 6, a side perspective view depicts sliding supports 42 retracted to illustrate an open space 58 defined over hinge assembly 34. Springs 48 bias inner portion 46 and outer portion 44 to move in an alternating direction away from each other in the flat position so that flexible display 32 has support underneath it. As housing portions 12 and 14 rotate towards the flat position, a turning of springs 48 as depicted by arrows 54 introduced by the cam allows the sliding motion apart as depicted by arrow 56 so that inner portion 46 slides over the open space 58 defined over hinge assembly 34. Open space 58 provides room for flexible display 32 to fold, thus adapting to the change in relative length along the inner circumference of the rotating housing portions 12 and 14.

Figure 7:
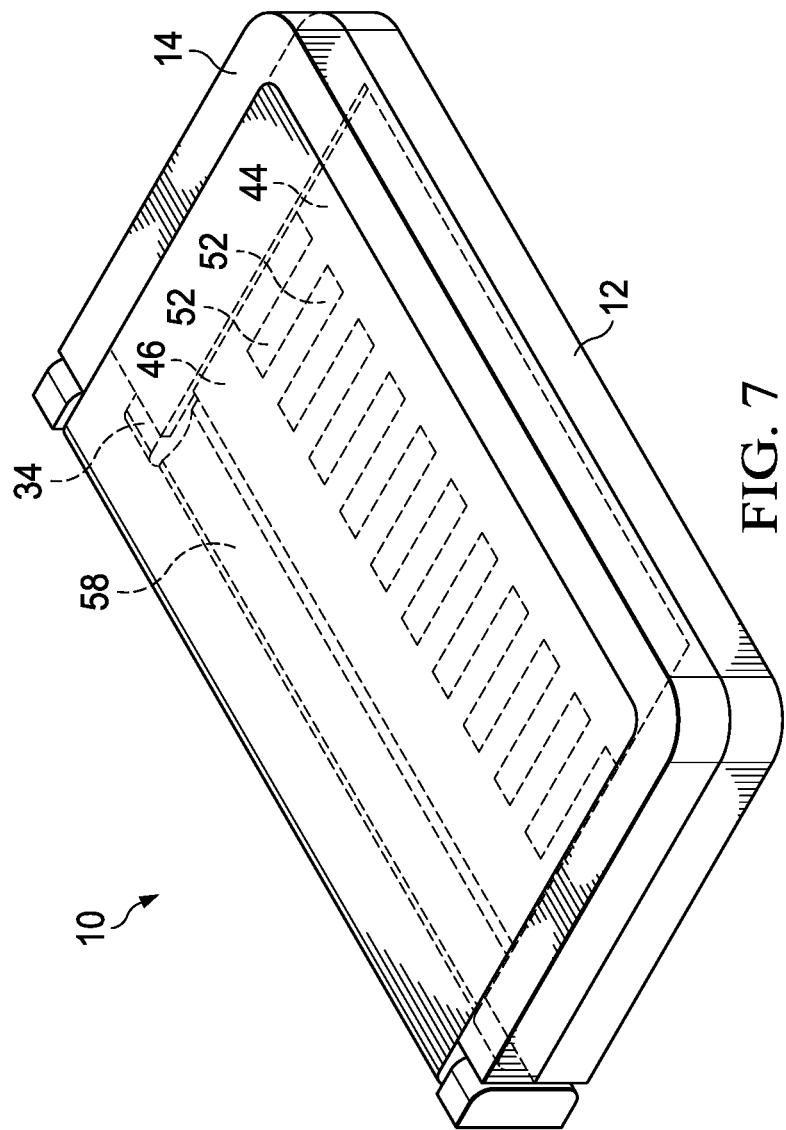
FIG. 7 depicts a side perspective view of one housing portion and sliding support with the hinge assembly in a closed position.

Referring now to FIG. 7, a side perspective view depicts one housing portion 12 and sliding support 42 with hinge assembly 34 in a closed position. In the example embodiment, extension member 40 has overcome the bias of spring 48 to press sliding support 42 and planar portions 44 and 46 together so that fingers 52 engage in an interlocked relationship. Movement of inner planar portion 46 away from hinge assembly 34 has defined an open space 58 that provides room for flexible display 32 to fold without compressing or wrinkling.

Figure 8:
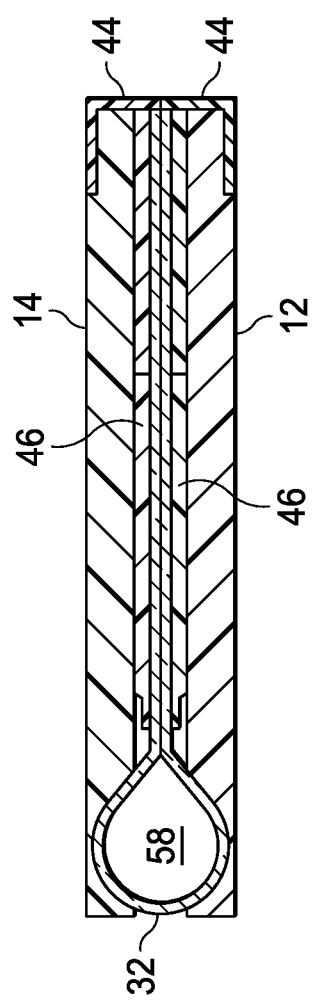
FIG. 8 depicts a side cutaway view of the information handling system rotated to a closed position with space defined to fold the flexible display.

Referring now to FIG. 8, a side cutaway view depicts information handling system 10 rotated to a closed position with space 58 defined to fold flexible display 32. In the closed position, inner planar portions 46 of sliding support 42 slides away from hinge assembly 34 to leave space 58 in which flexible display 32 has room to fold without pinching or undue constraint. Outer planar portion 44 of sliding support 42 slides inward towards hinge assembly 34 in the opposite direction of inner planar portion 46 as the relative size of flexible display 32 decreases along the inner circumference of housing portions 12 and 14.

Figure 9:
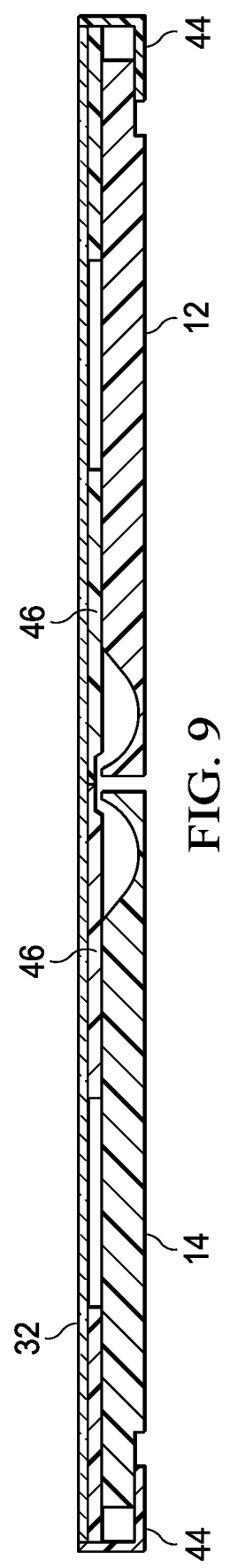
FIG. 9 depicts a side cutaway view of the information handling system rotated to a flat position with the flexible display supported by the sliding support.

Referring now to FIG. 9, a side cutaway view depicts information handling system 10 rotated to a flat position with flexible display 32 supported by sliding support 42. Inner planar portions 46 of sliding support 42 has slid in response to the biasing force of spring 48 towards and over top of hinge assembly 34. Outer planar portion 44 of sliding support 42 has slid out past each of housing portions 12 and 14 to support flexible display 32 across the length of the system. In the central region of information handling system 10 over hinge assembly 34, inner planar portion 46 of sliding support 42 provides support to flexible display 32 against end user touches.

Although the present invention has been described in detail, it should be understood that various changes, substitutions and alterations can be made hereto without departing from the spirit and scope of the invention as defined by the appended claims.

What is claimed is:

1. An information handling system comprising:
    first and second housing portions;
    a hinge rotationally coupling the first and second housing portions to rotate between a closed position and a planar position;
    processing components disposed in the first and second housing portions and operable to process information;
    a flexible display disposed over the first and second housing portions and interfaced with the processing components to present the information as visual images; and
    a sliding support platform disposed under the flexible display having first and second portions interfaced at plural interlaced fingers that slide together in the closed position to expose the hinge and slide apart in the planar position to cover the hinge.

2. The information handling system of claim 1 further comprising:
    a spring interfaced with the sliding support platform and biasing the first and second portions to slide apart;
    wherein the hinge engages the sliding support platform to slide together in the closed position.

3. The information handling system of claim 2 wherein the closed position defines an open area proximate the hinge in the closed position, the flexible display folding into the open area in the closed position.

4. The information handling system of claim 3 wherein the sliding support platform extends at one end past the first housing portion, sliding toward the hinge in the closed position and away from the hinge in the open position.

5. The information handling system of claim 1 wherein the sliding support platform first and second portions slide concurrently in opposite directions.

6. The information handling system of claim 1 further comprising a first sliding support platform disposed over the first housing portion and a second sliding support platform disposed over the second housing portion.

7. The information handling system of claim 6 wherein the hinge comprises a dual axis synchronized hinge.

8. The information handling system of claim 7 wherein the display comprises an organic light emitting diode display having a flexible plastic substrate.

9. The information handling system of claim 8 wherein the plastic substrate is disposed over the hinge, the organic light emitting diode display having a glass substrate distal the hinge.

10. A flexible display support comprising:
    a first planar portion having plural fingers;
    a second planar portion having plural fingers aligned to interlace with the plural fingers of the first planar portion; and
    a biasing mechanism coupled to the first and second planar portions to bias the plural fingers to separate thereby extending the size of a support surface configured to support a flexible display; and
    a cam engaged with the biasing mechanism to delay movement of the first and second planar portions apart.

11. The flexible display support of claim 10 further comprising a lip extending out from the first planar portion and configured to engage a portable information handling system housing.

12. The flexible display support of claim 11 wherein the second planar portion slides toward the first planar portion to define a space opposite the lip for folding the flexible display.

* * * * *